W. MENNIE.
DIFFERENTIAL GEARING.
APPLICATION FILED OCT. 9, 1916.
1,225,842.
Patented May 15, 1917.
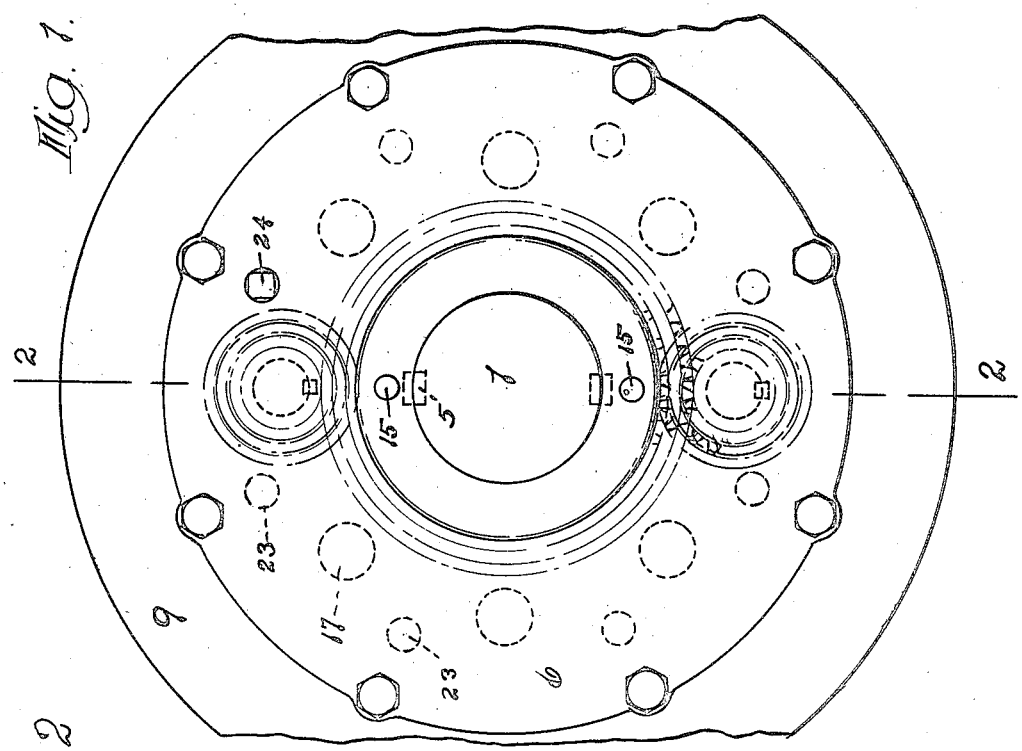
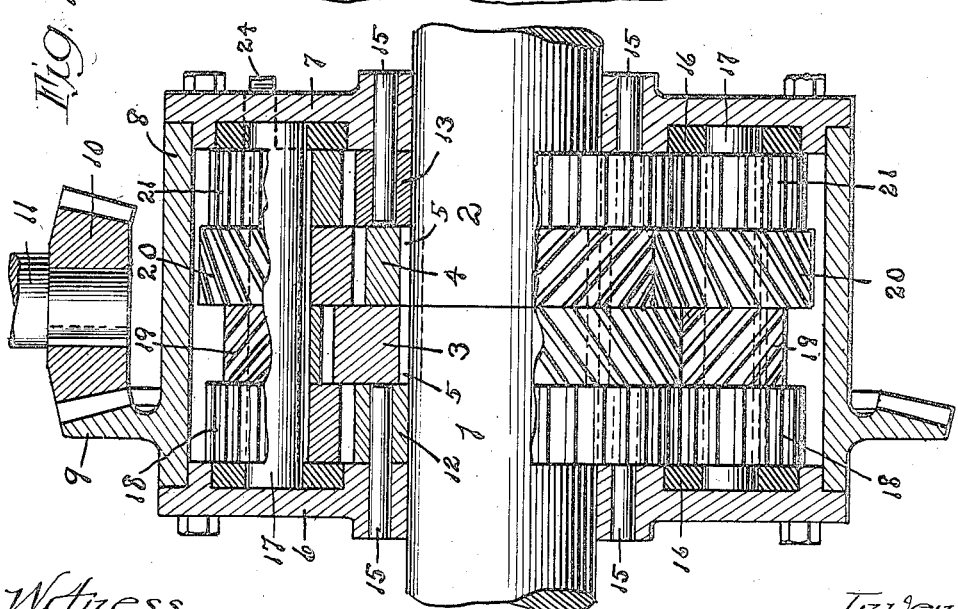
Witness
E. R. Barrett,
Inventor
William Mennie.
By Pagelsen and Spencer
Attys

UNITED STATES PATENT OFFICE.

WILLIAM MENNIE, OF DETROIT, MICHIGAN, ASSIGNOR OF ONE-HALF TO CARL A. FETTIG, OF DETROIT, MICHIGAN.

DIFFERENTIAL GEARING.

1,225,842.   Specification of Letters Patent.   Patented May 15, 1917.

Application filed October 9, 1916. Serial No. 124,479.

*To all whom it may concern:*

Be it known that I, WILLIAM MENNIE, a citizen of the Dominion of Canada, and residing at Detroit, in the county of Wayne and State of Michigan, have invented a new and Improved Differential Gearing, of which the following is a specification.

This invention relates to gearing employed to drive two alined shafts, usually the rear axles or jack-shafts of motor vehicles, and its object is to provide mechanism of this character which shall be simple in construction, durable and strong.

This invention consists, in connection with a pair of alined shafts and gears on their adjacent ends, of a driving member revoluble on the ends of these shafts and provided with gears which are rigidly connected to the driving member, a set of connected co-axial planetary pinions meshing with the gears on the driving member and the gears connected to the shaft, and means to position these planetary pinions so that they may revolve about their shaft as a unit.

It further consists in forming the teeth of the gears secured to the shafts substantially spiral, the angles of the teeth of the two gears being opposite.

In the accompanying drawing, Figure 1 is an end elevation of this improved differential gearing. Fig. 2 is a section on the line 2—2 of Fig. 1.

Similar reference characters refer to like parts throughout the several views.

The two shaft ends 1 and 2 have secured to them the gears 3 and 4 of different diameters by means of the keys 5. A casing is revoluble on these shafts and is of any desired construction, that illustrated being made up of a pair of heads 6 and 7 and the shell 8 to which is connected any desired form of driving mechanism, the ring 9 of teeth which mesh with the pinion 10 on the shaft 11 being shown as an example. Gears 12 and 13 of the same size are connected to the heads 6 and 7 and revolve therewith. Pins 15 may be employed to form this connection.

The heads may be counterbored to receive the rings 16 that carry the pins 17 on which planetary pinions 18, 19, 20 and 21 are mounted. These rings are mere spacers and are not necessary theoretically. Each group of pinions is substantially integral with each other or are so mounted on the supporting pins that they are substantially rigid with respect to each other. One group only is necessary but more are preferred. One of the rings 16 may be formed with holes 23 which may receive the screw 24 carried by the head 7 so that the rings may be prevented from revolving within the casing if desired in case of accident.

The teeth of the gears 3 and 4 are preferably substantially spiral and at an angle to each other. The teeth of the pinions 19 and 20 will of course match with those of these gears.

If the gears 3, 4, 12 and 13 were of the same diameter, there could be no differential action as all these gears would revolve at the same speed as the casing.

If the gears 3 and 4 were of the same diameter but of different diameter from the gears 12 and 13, there would be no differential action and no driving force would be transmitted to the shafts except that which is necessary to turn the planetary pinions, the only relative movement due to the turning of the casing being the travel of the rings 16 and the pinions relative to the casing, the rings traveling in advance of the casing when the gears 3 and 4 are smaller than the gears 12 and 13, and lagging behind the casing when the gears 3 and 4 are larger than the gears 12 and 13.

To produce a differential driving effect on the shafts, the gears 3 and 4 must be of unequal diameter, one being larger than the gears 12 and 13 and the other smaller, and preferably one being as much larger as the other is smaller. If either of the gears 3 and 4 were of the size of the gears 12 and 13, and the other of greater or less size, then the shaft to which the gear of equal size is attached will always revolve at the same speed as the casing while the other shaft would stand still if any resistance to its turning were offered more than necessary to merely revolve the planetary pinions.

By having the diameters of the gears 3 and 4 larger and smaller than the diameters of the gears 12 and 13, a pure differential action is secured. The additional diameter of one counteracts the lack in diameter of the other in their action on the planetary gears which will remain in mesh with the same teeth and cause the four gears to revolve together so long as the same stresses are on both shafts. But when one shaft is loaded heavier than the other (the inclination of the teeth of the gears 3 and 4 being disregarded for the present), the rings 16 and the pinions will travel in advance or lag behind the casing, depending upon whether the shaft carrying the larger gear is carrying the lighter or heavier load respectively.

It will be understood that the teeth of any, all or none of the gears and pinions may be spiral, although those shown will probably be all that will be desired of this type.

Because of the inclination of the teeth of the gears 3 and 4 and of the pinions meshing therewith, and because these pinions are rigidly connected together, the driving action of these pinions on the gears will result in forcing these gears together when the casing is turning in one direction and in forcing these gears apart and against the gears 12 and 13 when the casing is turning in the opposite direction. The result is that the friction between these gears 3 and 4 resists relative movement between them and similarly the friction between these gears and the gears 12 and 13 resists relative movement between these gears 3 and 4 and the casing. Therefore, there is less tendency for the two shafts to revolve independently or at different speeds and much steadier movement of the vehicle is secured when traveling over soft roadways. The action of the two pinions on these two gears resembles that of a right and left threaded nut, the gears being drawn together or forced apart by the inclines of the teeth. It will therefore be seen that if either shaft tends to turn faster than the casing, as when a vehicle turns a corner, the tendency of its gear to turn in advance will cause it to screw itself out of or into the nut and thus relieve the frictional lock caused by the end thrust just referred to. The inclination of these teeth can be made as great or as small as desired, depending upon the work to be performed.

I claim:—

1. In a differential gearing, the combination of a pair of alined shafts, gears on the adjacent ends of the shaft, a casing revolubly mounted on the adjacent ends of the shafts and means to revolve the casing, a pair of gears revoluble on said shafts and connected to said casing to revolve therewith, and a set of alined planetary pinions rigidly united and meshing with said four gears.

2. In a differential gearing, the combination of a pair of alined shafts, a pair of gears of unequal size on said shafts, one being attached to each shaft, a casing revolubly mounted on the adjacent ends of the shafts and means to revolve the casing, a pair of gears revoluble on said shafts and connected to said casing to revolve therewith, and a set of alined planetary pinions rigidly united and meshing with said four gears.

3. In a differential gearing, the combination of a pair of alined shafts, a pair of gears of unequal size on said shafts, one being attached to each shaft, a casing revolubly mounted on the adjacent ends of the shafts and means to revolve the casing, a pair of gears of equal size revoluble on said shafts and rigidly connected to the casing to revolve therewith, and a set of alined rigidly united planetary pinions meshing with said gears.

4. In a differential gearing, the combination of a pair of alined shafts, a pair of gears of unequal size on said shafts, one being attached to each shaft, a casing revolubly mounted on the adjacent ends of the shafts and means to revolve the casing, a pair of gears of equal size revoluble on said shafts and rigidly connected to the casing to revolve therewith, and a set of alined rigidly united planetary pinions meshing with said gears, the diameters of the gears attached to the casing being intermediate the diameters of the gears attached to the shafts.

5. In a differential gearing, the combination of a pair of alined shafts, a pair of gears of unequal size on said shafts, one being attached to each shaft, a casing revolubly mounted on the adjacent ends of the shafts and means to revolve the casing, a pair of gears revoluble on said shafts and connected to said casing to revolve therewith, and a set of alined planetary pinions rigidly united and meshing with said four gears, the teeth of the gears attached to the shafts being substantially spiral and inclined in opposite directions.

6. In a differential gearing, the combination of a pair of alined shafts, a pair of gears of unequal size on said shafts, one being attached to each shaft, a casing revolubly mounted on the adjacent ends of the shafts and means to revolve the casing, a pair of gears revoluble on said shafts and connected to said casing to revolve therewith, a set of alined planetary pinions rigidly united and meshing with said four gears, a shaft for said pinions, and a pair of rings mounted within the casing to which the pinion shaft is connected to position the pinions.

7. In a differential gearing, the combination of a pair of alined shafts, a pair of gears of unequal size on said shafts, one being attached to each shaft, a casing revolubly mounted on the adjacent ends of the shafts and means to revolve the casing, a pair of gears revoluble on said shafts and connected to said casing to revolve therewith, a set of alined planetary pinions rigidly united and meshing with said four gears, a shaft for said pinions, a pair of rings mounted within the casing to which the pinion shaft is connected to position the pinions, and a locking member adapted to be mounted in the casing in engagement with one of said rings.

8. In a driving mechanism for the alined ends of a divided shaft, the combination of gears of unequal diameters secured to the ends of said shaft, a driving member revoluble co-axially with said shafts and provided with a concentric toothed portion, and a set of planetary pinions rigidly connected together and meshing with the gears on the shaft and with the toothed portion of the driving member.

9. In a driving mechanism for the alined ends of a divided shaft, the combination of gears of unequal diameters secured to the ends of said shaft, a driving member revoluble co-axially with said shafts and provided with a concentric toothed portion, a set of planetary pinions rigidly connected together and meshing with the gears on the shaft and with the toothed portion of the driving member, and means to support said planetary pinions to cause them to travel in a path concentric with the axis of said shafts.

WILLIAM MENNIE.